(12) United States Patent
Danielson et al.

(10) Patent No.: US 10,364,177 B2
(45) Date of Patent: *Jul. 30, 2019

(54) GLASS COMPOSITIONS HAVING HIGH THERMAL AND CHEMICAL STABILITY AND METHODS OF MAKING THEREOF

(71) Applicant: Corning Incorporated, Corning, NY (US)

(72) Inventors: Paul Stephen Danielson, Dundee, NY (US); Adam James Ellison, Painted Post, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 681 days.

This patent is subject to a terminal disclaimer.

(21) Appl. No.: 14/270,796

(22) Filed: May 6, 2014

(65) Prior Publication Data

US 2014/0243186 A1 Aug. 28, 2014

Related U.S. Application Data

(60) Continuation of application No. 12/943,268, filed on Nov. 10, 2010, now Pat. No. 8,763,429, and a continuation of application No. 13/666,183, filed on Nov. 1, 2012, now Pat. No. 8,753,993, which is a continuation of application No. 12/943,268, filed on Nov. 10, 2010, now Pat. No. 8,763,429, which is a division of application No. 11/704,837, filed on Feb. 9, 2007, now Pat. No. 7,833,919.

(60) Provisional application No. 60/772,600, filed on Feb. 10, 2006.

(51) Int. Cl.
*C03C 3/091* (2006.01)
*C03B 17/06* (2006.01)
*C03C 3/095* (2006.01)

(52) U.S. Cl.
CPC ............ *C03C 3/091* (2013.01); *C03B 17/06* (2013.01); *C03B 17/064* (2013.01); *C03C 3/095* (2013.01)

(58) Field of Classification Search
CPC .................................................. C03C 3/091
See application file for complete search history.

(56) References Cited

U.S. PATENT DOCUMENTS

| | | | |
|---|---|---|---|
| 2,961,328 A | 11/1960 | Babcock et al. ............... | 106/52 |
| 3,338,696 A | 8/1967 | Dockerty ....................... | 65/145 |
| 3,682,609 A | 8/1972 | Dockerty ....................... | 65/83 |
| 4,394,453 A | 7/1983 | Dumbaugh, Jr. ............... | 501/66 |
| 4,554,259 A | 11/1985 | Franklin et al. | |
| 4,634,683 A | 1/1987 | Dumbaugh, Jr. ............... | 501/32 |
| 4,634,684 A | 1/1987 | Dumbaugh, Jr. ............... | 501/69 |
| 4,666,868 A | 5/1987 | Dumbaugh, Jr. ............... | 501/32 |
| 4,666,869 A | 5/1987 | Dumbaugh, Jr. ............... | 501/32 |
| 4,994,415 A | 2/1991 | Imai et al. ...................... | 501/66 |
| 5,116,787 A | 5/1992 | Dumbaugh, Jr. ............... | 501/66 |
| 5,116,788 A | 5/1992 | Dumbaugh, Jr. ............... | 501/66 |
| 5,116,789 A | 5/1992 | Dumbaugh et al. ............ | 501/66 |
| 5,326,730 A | 7/1994 | Dumbaugh et al. ............ | 501/69 |
| 5,374,595 A | 12/1994 | Dumbaugh et al. ............ | 501/66 |
| 5,489,558 A | 2/1996 | Moffatt et al. .................. | 501/69 |
| 5,506,180 A | 4/1996 | Ponthieu ......................... | 501/66 |
| 5,508,237 A | 4/1996 | Moffatt et al. .................. | 501/69 |
| 5,741,746 A | 4/1998 | Kohli et al. ..................... | 501/70 |
| 5,770,535 A | 6/1998 | Brix et al. ....................... | 501/67 |
| 5,785,726 A | 7/1998 | Dorfeld et al. | |
| 5,801,109 A | 9/1998 | Nishizawa et al. ............. | 501/66 |
| 5,811,361 A | 9/1998 | Miwa | |
| 5,824,127 A | 10/1998 | Bange et al. | |
| 5,851,939 A | 12/1998 | Miwa .............................. | 501/70 |
| 6,060,168 A | 5/2000 | Kohli ............................ | 428/428 |
| 6,096,670 A | 8/2000 | Lautenschläger et al. ..... | 501/67 |
| 6,128,924 A | 10/2000 | Bange et al. | |
| 6,319,867 B1 | 11/2001 | Chacon et al. .................. | 501/66 |
| 6,329,310 B1 | 12/2001 | Peuchert et al. ................ | 501/66 |
| 6,358,873 B1 | 3/2002 | Stewart | |
| 6,417,124 B1 | 7/2002 | Peuchert et al. ................ | 501/66 |
| 6,468,933 B1 | 10/2002 | Narita et al. .................... | 501/56 |
| RE37,920 E | 12/2002 | Moffatt et al. .................. | 501/69 |
| 6,537,937 B1 | 3/2003 | Nishizawa et al. | |
| 6,664,203 B2 | 12/2003 | Nagashima et al. ............ | 501/66 |
| 6,680,266 B1 | 1/2004 | Peuchert et al. ................ | 501/66 |
| 6,831,029 B2 | 12/2004 | Chacon et al. .................. | 501/66 |

(Continued)

FOREIGN PATENT DOCUMENTS

| | | |
|---|---|---|
| CN | 1111215 | 11/1995 |
| CN | 1303827 | 7/2001 |

(Continued)

OTHER PUBLICATIONS

Ohsawa, et al., "Reactivities of Various Silicates with Sodium Hydroxide Solution," Am. Ceram. Soc. Bull, 1980, vol. 59, pp. 1147-1150.
Cassidy et al., "Physical and Chemical Properties of Australasian Microtektites," J. Geophys. Res., 1969, vol. 74, pp. 1008-1025.
Nikulin et al., "Acoustic Properties of Alkali-Free Aluminosilicate Glasses," Soviet Jrnl Glass Phys Chem (Fizika I Khimiya Stekla translated), 1981, vol. 7, pp. 287-291.
Orlov A.D., Razrabotka Sostavov I Tekhnologii Tugoplavkikh Elektrovakuumnykh Stekol Volframovoi Gruppy. Thesis. Moskva, 1991.
Stanworth J.E., "Some Investigations on Alumino-Phosphate and Alumino-Silicate Glasses," J. Soc. Glass Technol., 1946, vol. 30, pp. 381-397.

(Continued)

Primary Examiner — Elizabeth A. Bolden
(74) Attorney, Agent, or Firm — Thomas R. Beall; Ryan T. Hardee

(57) ABSTRACT

Described herein are alkali-free, boroalumino silicate glasses exhibiting desirable physical and chemical properties for use as substrates in flat panel display devices, such as, active matrix liquid crystal displays (AMLCDs). In accordance with certain of its aspects, the glasses possess good dimensional stability as a function of temperature.

10 Claims, 2 Drawing Sheets

(56) References Cited

U.S. PATENT DOCUMENTS

| | | | |
|---|---|---|---|
| 6,933,253 B2 | 8/2005 | Naka et al. | |
| RE38,959 E | 1/2006 | Kohli | |
| 6,992,030 B2 | 1/2006 | Paulson | |
| 7,534,734 B2 | 5/2009 | Ellison | |
| 7,563,737 B2 | 7/2009 | Fechner et al. | |
| 7,582,581 B2 | 9/2009 | Kawaguchi et al. | |
| 7,696,113 B2 | 4/2010 | Ellison | |
| 7,709,406 B2 | 5/2010 | Cornelius et al. | |
| 7,833,919 B2 | 11/2010 | Danielson et al. | 501/66 |
| 7,851,394 B2 | 12/2010 | Ellison | |
| 7,935,649 B2 | 5/2011 | Ellison | |
| 7,946,128 B2 | 5/2011 | Cornelius et al. | |
| 8,007,913 B2 | 8/2011 | Coppola et al. | |
| 8,187,715 B2 | 5/2012 | Danielson et al. | 428/432 |
| 8,598,056 B2 * | 12/2013 | Ellison et al. | 501/66 |
| 8,753,993 B2 * | 6/2014 | Danielson et al. | 501/66 |
| 8,763,429 B2 * | 7/2014 | Danielson et al. | 65/90 |
| 2001/0034294 A1 | 10/2001 | Peuchart et al. | |
| 2002/0010066 A1 | 1/2002 | Nakashima et al. | 501/69 |
| 2002/0082158 A1 | 6/2002 | Chacon et al. | |
| 2003/0087746 A1 | 5/2003 | Ritter et al. | |
| 2004/0018934 A1 | 1/2004 | Ott et al. | |
| 2004/0029702 A1 | 2/2004 | Naumann et al. | 501/70 |
| 2004/0043887 A1 | 3/2004 | Paulson | 501/66 |
| 2005/0065014 A1 | 3/2005 | Narita et al. | |
| 2006/0003884 A1 | 1/2006 | Nishizawa et al. | |
| 2006/0242996 A1 | 11/2006 | DeAngelis et al. | |
| 2006/0293162 A1 | 12/2006 | Nakashima et al. | 501/69 |
| 2007/0027019 A1 | 2/2007 | Nishizawa et al. | |
| 2007/0190340 A1 | 8/2007 | Coppola et al. | |
| 2009/0286091 A1 | 11/2009 | Danielson et al. | |
| 2011/0048074 A1 | 3/2011 | Danielson et al. | |
| 2011/0079049 A1 | 4/2011 | Ellison | |
| 2011/0082022 A1 | 4/2011 | Ellison | |
| 2012/0088648 A1 | 4/2012 | Ellison et al. | 501/59 |
| 2013/0065747 A1 | 3/2013 | Danielson et al. | |

FOREIGN PATENT DOCUMENTS

| | | |
|---|---|---|
| CN | 1445187 A | 10/2003 |
| DE | 4213579 | 10/1992 |
| DE | 19601922 | 5/2001 |
| EP | 0 559 389 | 9/1993 |
| EP | 0 672 629 | 9/1995 |
| EP | 0 714 862 | 3/1999 |
| EP | 0 576 362 | 8/1999 |
| FR | 2675795 | 10/1992 |
| GB | 479173 | 1/1938 |
| JP | 57-022140 | 2/1982 |
| JP | 60-239342 | 11/1985 |
| JP | 61-295256 | 12/1986 |
| JP | 07-277763 | 10/1995 |
| JP | 07-300336 | 11/1995 |
| JP | 09-048632 | 2/1997 |
| JP | 2644622 | 3/1997 |
| JP | 09-110460 | 4/1997 |
| JP | 09-156953 | 6/1997 |
| JP | 09-263421 | 10/1997 |
| JP | 10-025132 | 1/1998 |
| JP | 10-045422 | 2/1998 |
| JP | 10-072237 | 3/1998 |
| JP | 10-114538 | 5/1998 |
| JP | 10-130034 | 5/1998 |
| JP | 10-139467 | 5/1998 |
| JP | 10-231139 | 9/1998 |
| JP | 10-324526 | 12/1998 |
| JP | 11-043350 | 2/1999 |
| JP | 2871163 | 3/1999 |
| JP | 11-292563 | 10/1999 |
| JP | 2000-044278 | 2/2000 |
| JP | 2001-172041 | 6/2001 |
| JP | 2001-261366 | 9/2001 |
| JP | 2002-003240 | 1/2002 |
| JP | 2002-029775 | 1/2002 |
| JP | 2004-189535 | 7/2004 |
| SU | 833600 A1 | 5/1981 |
| SU | 1217804 A1 | 3/1986 |
| WO | 97/11919 | 4/1997 |
| WO | 97/11920 | 4/1997 |
| WO | 98/27019 | 6/1998 |
| WO | 2008/149021 | 12/2008 |

OTHER PUBLICATIONS

Jun. 14, 2013 Official Action in related Korean Application No. 10-2008-7022162 (with the Then pending claims attached; 7 pages).
May 17, 2013 Office Action in U.S. Appl. No. 13/666,183 (7 pages).
U.S. Appl. No. 60/772,034, F.T. Coppola et al., filed Feb. 10, 2006.
Dec. 24, 2010 Official Action in related Chinese App. No. 200780008383.5 (with then pending claims attached; 11 pages).
Sep. 25, 2012 Official Action in related Japanese App. No. 2008-554389 (with then pending claims attached; 8 pages).
Jul. 23, 2013 Official Action in related Japanese App. No. 2008-554389 (with then pending claims attached; 4 pages).
Sep. 4, 2013 Supplemental Information Disclosure Statement in related U.S. Appl. No. 12/943,268 (with attached PTO Form SB08; 7 pages).
Jun. 6, 2013 Office Action in U.S. Appl. No. 12/943,268.

* cited by examiner

GLASS COMPOSITIONS HAVING HIGH THERMAL AND CHEMICAL STABILITY AND METHODS OF MAKING THEREOF

CROSS-REFERENCE TO RELATED APPLICATION

This application is a continuation of: (1) pending U.S. application Ser. No. 12/943,268 filed on Nov. 10, 2010, which is a divisional of U.S. application Ser. No. 11/704,837 filed on Feb. 9, 2007, now U.S. Pat. No. 7,833,919, which claims the benefit under 35 USC §119(e) of U.S. Provisional Application No. 60/772,600 filed Feb. 10, 2006; and (2) pending U.S. application Ser. No. 13/666,183 filed on Nov. 1, 2012, which is a continuation of pending U.S. application Ser. No. 12/943,268. The contents of U.S. application Ser. Nos. 13/666,183, 12/943,268, 11/704,837, and 60/772,600 are hereby incorporated by reference in their entireties.

BACKGROUND

The production of liquid crystal displays such as, for example, active matrix liquid crystal display devices (AMLCDs) is very complex, and the properties of the substrate glass are extremely important. First and foremost, the glass substrates used in the production of AMLCD devices need to have their physical dimensions tightly controlled. The downdraw sheet drawing processes and, in particular, the fusion process described in U.S. Pat. Nos. 3,338,696 and 3,682,609, both to Dockerty, are capable of producing glass sheets that can be used as substrates without requiring costly post-forming finishing operations such as lapping and polishing. Unfortunately, the fusion process places rather severe restrictions on the glass properties, which require relatively high liquidus viscosities.

In the liquid crystal display field, thin film transistors (TFTs) based on poly-crystalline silicon are preferred because of their ability to transport electrons more effectively. Poly-crystalline based silicon transistors (p-Si) are characterized as having a higher mobility than those based on amorphous-silicon based transistors (a-Si). This allows the manufacture of smaller and faster transistors, which ultimately produces brighter and faster displays.

One problem with p-Si based transistors is that their manufacture requires higher process temperatures than those employed in the manufacture of a-Si transistors. These temperatures range from 450° C. to 600° C. compared to the 350° C. peak temperatures employed in the manufacture of a-Si transistors. At these temperatures, most AMLCD glass substrates undergo a process known as compaction. Compaction, also referred to as thermal stability or dimensional change, is an irreversible dimensional change (shrinkage) in the glass substrate due to changes in the glass' fictive temperature. "Fictive temperature" is a concept used to indicate the structural state of a glass. Glass that is cooled quickly from a high temperature is said to have a higher fictive temperature because of the "frozen in" higher temperature structure. Glass that is cooled more slowly, or that is annealed by holding for a time near its annealing point, is said to have a lower fictive temperature.

The magnitude of compaction depends both on the process by which a glass is made and the viscoelastic properties of the glass. In the float process for producing sheet products from glass, the glass sheet is cooled relatively slowly from the melt and, thus, "freezes in" a comparatively low temperature structure into the glass. The fusion process, by contrast, results in very rapid quenching of the glass sheet from the melt, and freezes in a comparatively high temperature structure. As a result, a glass produced by the float process may undergo less compaction when compared to glass produced by the fusion process, since the driving force for compaction is the difference between the fictive temperature and the process temperature experienced by the glass during compaction. Thus, it would be desirable to minimize the level of compaction in a glass substrate that is produced by a downdraw process.

There are two approaches to minimize compaction in glass. The first is to thermally pretreat the glass to create a fictive temperature similar to the one the glass will experience during the p-Si TFT manufacture. However there are several difficulties with this approach. First, the multiple heating steps employed during the p-Si TFT manufacture create slightly different fictive temperatures in the glass that cannot be fully compensated for by this pretreatment. Second, the thermal stability of the glass becomes closely linked to the details of the p-Si TFT manufacture, which could mean different pretreatments for different end-users. Finally, pretreatment adds to processing costs and complexity.

Another approach is to slow the kinetics of the compaction response. This can be accomplished by raising the viscosity of the glass. Thus, if the strain point of the glass is much greater than the process temperatures to be encountered (e.g., if the strain point is ~200-300° C. greater than the process temperatures for short exposures), compaction is minimal. The challenge with this approach, however, is the production of high strain point glass that is cost effective.

Described herein are alkali-free glasses and methods for making the same that possess high strain points and, thus, good dimensional stability (i.e., low compaction). Additionally, the glass compositions also possess all of the properties required for downdraw processing, which is important in the manufacturing of substrates for liquid crystal displays.

SUMMARY

In accordance with the purposes discussed above, the disclosed materials, compounds, compositions, articles, devices, and methods, as embodied and broadly described herein, are alkali-free, boroalumino silicate glasses exhibiting desirable physical and chemical properties for use as substrates in flat panel display devices, such as, active matrix liquid crystal displays (AMLCDs). In accordance with certain of its aspects, the glasses possess good dimensional stability as a function of strain point. Additional advantages will be set forth in part in the description that follows, and in part will be evident from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE DRAWINGS

The accompanying figures, which are incorporated in and constitute a part of this specification, illustrate several aspects described below.

DETAILED DESCRIPTION

Figure 1:
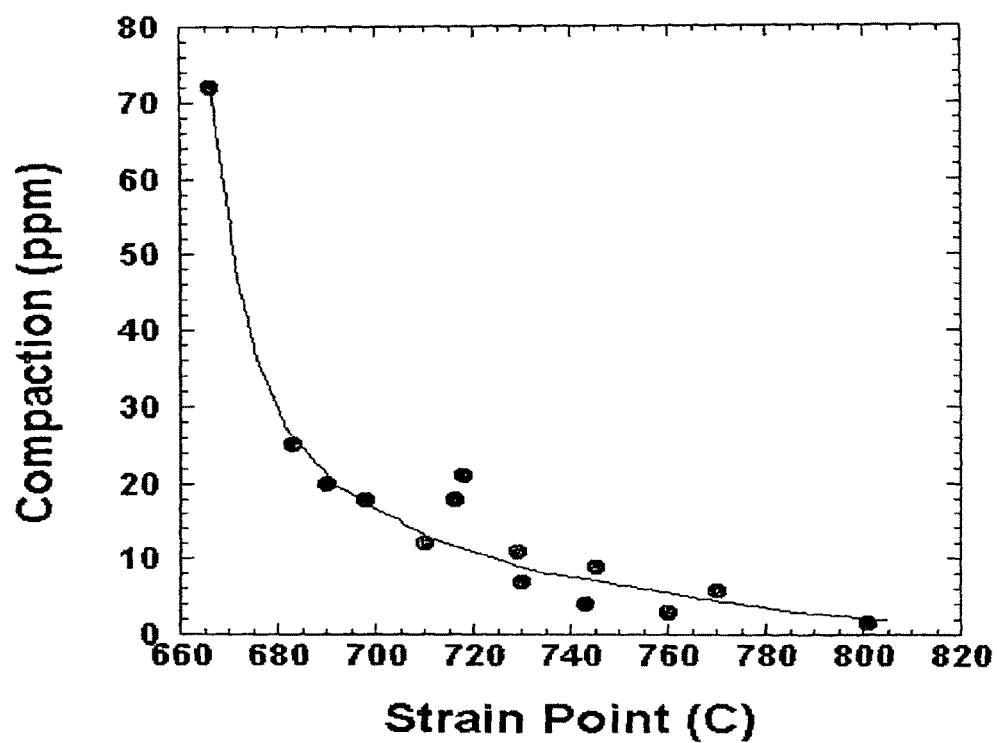
FIG. 1 shows the dependence of dimensional change, here labeled "compaction," versus strain point for a series of glass compositions described herein heated at 600° C. for five minutes.

The materials, compounds, compositions, articles, devices, and methods described herein may be understood more readily by reference to the following detailed description of specific aspects of the disclosed subject matter and the Examples included therein and to the Figures.

Before the present materials, compounds, compositions, articles, devices, and methods are disclosed and described, it is to be understood that the aspects described below are not limited to specific synthetic methods or specific reagents (specific batch components), as such may, of course, vary. It is also to be understood that the terminology used herein is for the purpose of describing particular aspects only and is not intended to be limiting. Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the layer" includes combinations of two or more such layers, and the like.

"Optional" or "optionally" means that the subsequently described event or circumstance can or cannot occur, and that the description includes instances where the event or circumstance occurs and instances where it does not.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers or prepared by methods known to those skilled in the art.

Also, disclosed herein are materials, compounds, compositions, and components that can be used for, can be used in conjunction with, can be used in preparation for, or are products of the disclosed methods and compositions. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a composition is disclosed and a number of modifications that can be made to a number of components of the composition are discussed, each and every combination and permutation that are possible are specifically contemplated unless specifically indicated to the contrary. Thus, if a class of components A, B, and C are disclosed as well as a class of components D, E, and F and an example of a composition A-D is disclosed, then even if each is not individually recited, each is individually and collectively contemplated. Thus, in this example, each of the combinations A-E, A-F, B-D, B-E, B-F, C-D, C-E, and C-F are specifically contemplated and should be considered disclosed from disclosure of A, B, and C; D, E, and F; and the example combination A-D. Likewise, any subset or combination of these is also specifically contemplated and disclosed. Thus, for example, the sub-group of A-E, B-F, and C-E are specifically contemplated and should be considered disclosed from disclosure of A, B, and C; D, E, and F; and the example combination A-D. This concept applies to all aspects of this disclosure including, but not limited to, steps in methods of making and using the disclosed compositions. Thus, if there are a variety of additional steps that can be performed it is understood that each of these additional steps can be performed with any specific aspect or combination of aspects of the disclosed methods, and that each such combination is specifically contemplated and should be considered disclosed.

As a particular example of the subset concept, the range for any of the components of the glasses of the invention (including the range for a sum of the components) or the range for any property of those glasses, including, in particular, the range for the component or property set forth in a claim, can be narrowed (amended) at either the range's upper or lower end to any value for that component or property disclosed herein, whether the disclosure is a corresponding upper or lower end of another range for the component or property (e.g., a preferred range) or the amount of the component used in a particular example or a property exhibited by a particular example. With regard to narrowing claimed ranges based on examples, such narrowing applies irrespective of whether or not the remainder of the example is within the scope of the claim being narrowed.

Reference will now be made in detail to specific aspects of the disclosed materials, compounds, compositions, articles, and methods, examples of which are illustrated in the accompanying Examples and Figures.

Described herein are alkali-free glasses and methods for making the same that possess high strain points and, thus, good dimensional stability (i.e., low compaction). A high strain point glass can prevent panel distortion due to compaction/shrinkage during thermal processing subsequent to manufacturing of the glass.

It has been discovered that a glass with a strain point greater than 700° C. will minimize the dimensional changes (i.e., compaction) experienced by glass that is quickly cooled then reheated for a brief period of time. In one aspect, the glass compositions described herein have a strain point greater than or equal to 700° C. or greater than or equal to 710° C. In a further aspect, the glass compositions described herein have a strain point between 700° C. and 800° C., 700° C. and 775° C., 700° C. and 750° C., or 700° C. and 730° C. In a further aspect, the high strain point glass compositions described herein have a thermal compaction when subjected to a 600° C. heat treatment for 5 minutes that is less than 30 ppm, less than 25 ppm, less than 20 ppm, less than 15 ppm, or less than 10 ppm, with the lower compactions being preferred.

In one aspect, the glasses described herein have a strain point in excess of about 700° C. and experience less than 30 ppm compaction (i.e., dimensional change) after heat treatment for five minutes at 600° C. This temperature and duration were chosen to approximate a low temperature poly-silicon heat treatment cycle. FIG. 1 shows experimental data for a series of glasses with measured strain points along the x-axis, versus measured dimensional change after five minutes at 600° C.

In one aspect, described herein is an alkali-free glass comprising in mole percent on an oxide basis:

| | |
|---|---|
| $SiO_2$ | 64.0-72.0 |
| $Al_2O_3$ | 9.0-16.0 |
| $B_2O_3$ | 1.0-5.0 |
| $MgO + La_2O_3$ | 1.0-7.5 |
| CaO | 2.0-7.5 |
| SrO | 0.0-4.5 |
| BaO | 1.0-7.0 | wherein $\Sigma(MgO+CaO+SrO+BaO+3La_2O_3)/(Al_2O_3) \geq 1.15$, where $Al_2O_3$, MgO, CaO, SrO, BaO, and $La_2O_3$ represent the mole percents of the respective oxide components.

In a further aspect, described herein is an alkali-free glass comprising in mole percent on an oxide basis:

| | |
|---|---|
| $SiO_2$ | 64.0-72.0 |
| $B_2O_3$ | 1.0-5.0 |
| $Al_2O_3$ | 9.0-16.0 |
| $MgO + La_2O_3$ | 1.0-7.5 |
| CaO | 2.0-7.5 |
| SrO | 0.0-4.5 |
| BaO | 1.0-7.0 | wherein:

1.15 $\leq \Sigma(MgO+CaO+SrO+BaO+3La_2O_3)/(Al_2O_3) \leq 1.55$, where $Al_2O_3$, MgO, CaO, SrO, BaO, and $La_2O_3$ represent the mole percents of the respective oxide components;

the glass has a strain point greater than or equal to 700° C.;

the glass has a temperature at 200 poise viscosity less than or equal to 1,665° C.; and the glass has a viscosity at the liquidus temperature greater than or equal to 85,000 poise.

In another aspect, described herein is an alkali-free glass comprising in mole percent on an oxide basis:

| | |
|---|---|
| $SiO_2$ | 65.0-71.0 |
| $Al_2O_3$ | 9.0-16.0 |
| $B_2O_3$ | 1.5-4.0 |
| $MgO + La_2O_3$ | 0.5-7.5 |
| CaO | 2.0-6.0 |
| SrO | 0.0-4.5 |
| BaO | 1.0-7.0 |
| $La_2O_3$ | >0.0 and less than or equal to 4.0 | wherein $\Sigma(MgO+CaO+SrO+BaO+3La_2O_3)/(Al_2O_3) \geq 1.15$ (preferably, $\geq 1.2$), where $Al_2O_3$, MgO, CaO, SrO, BaO, and $La_2O_3$ represent the mole percents of the respective oxide components.

In a further aspect, described herein is an alkali-free glass comprising in mole percent on an oxide basis:

| | |
|---|---|
| $SiO_2$ | 65.0-72.0 |
| $Al_2O_3$ | 10.0-15.0 |
| $B_2O_3$ | 1.0-4.0 |
| MgO | 2.0-7.5 |
| CaO | 3.0-6.0 |
| SrO | 0.0-4.5 |
| BaO | 1.0-6.0 | wherein $\Sigma(MgO+CaO+SrO+BaO)/(Al_2O_3) \geq 1.15$, where $Al_2O_3$, MgO, CaO, SrO, and BaO represent the mole percents of the respective oxide components.

In an additional aspect, described herein is an alkali-free glass comprising $SiO_2$, $Al_2O_3$, $B_2O_3$, MgO, CaO, and at least one of SrO and BaO, wherein the glass' composition satisfies the relationship:

[MgO]:[CaO]:[SrO+BaO]=1±0.15:1±0.15:1±0.15 (preferably,

[MgO]:[CaO]:[SrO+BaO]=1±0.1:1±0.1:1±0.1), where [MgO], [CaO], and [SrO+BaO] are the concentrations of the indicated components of the glass in mole percent on an oxide basis. Preferably, in connection with this aspect, the $B_2O_3$ concentration is less than or equal to 4.0 mole percent. As illustrated in the examples, it has been found that glasses that satisfy the above relationships have low liquidus temperatures (high liquidus viscosities) as is desired for downdraw processes, such as the fusion process. As discussed below, the SrO and BaO concentrations can be adjusted to optimize strain point, CTE, and density. Preferably, the BaO/SrO ratio in mole percent is equal to or greater than 2.0.

In the glass compositions described herein, $SiO_2$ serves as the basic glass former. In certain aspects, the concentration of $SiO_2$ can be greater than 64 mole percent in order to provide the glass with a density and chemical durability suitable for a flat panel display glass (e.g., an AMLCD glass), and a liquidus temperature (liquidus viscosity), which allows the glass to be formed by a downdraw process (e.g., a fusion process). In terms of an upper limit, in general, the $SiO_2$ concentration can be less than or equal to about 72.0 mole percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,650° C. In one aspect, the $SiO_2$ concentration is between 66.0 and 71.0 mole percent or between 66.5 and 70.5 mole percent.

$Al_2O_3$ is another glass former used to make the glasses described herein. An $Al_2O_3$ concentration greater than or equal to 9.0 mole percent provides the glass with a low liquidus temperature and a corresponding high liquidus viscosity. The use of at least 9.0 mole percent $Al_2O_3$ also improves the glass' strain point and modulus. In order to achieve an $\Sigma(MgO+CaO+SrO+BaO+3La_2O_3)/(Al_2O_3)$ ratio greater than or equal to 1.15 (see below), it is desirable to keep the $Al_2O_3$ concentration below 16.0 mole percent. In one aspect, the $Al_2O_3$ concentration is between 12.0 and 15.0 mole percent.

$B_2O_3$ is both a glass former and a flux that aids melting and lowers the melting temperature. To achieve these effects, the glass compositions described herein have $B_2O_3$ concentrations that are equal to or greater than 1.0 mole percent.

During the processing of displays, glass sheets are often held only at opposite edges, and therefore experience sagging in the unsupported central portion of the sheet. The amount of sag is a function of the geometry of the sheet, the density, and Young's modulus of the glass. The sheet geometry is dictated by the particular process employed, which is beyond the control of the glass manufacturer. For fixed density, an increase in Young's modulus is desirable since it reduces the amount of sag exhibited by large glass sheets during shipping, handling and thermal processing. Likewise, any increase in density should be accompanied by a proportionate increase in Young's modulus or it will result in increased sag. In one aspect, the glass has a density of less than or equal to 2.75 grams/cm$^3$. In another aspect, to minimize the contribution of the glass itself to sag, it is desirable that the ratio of Young's modulus/density is greater than 30.0 GPa·cm$^3$/g, greater than 30.5 GPa·cm$^3$/g, greater than 31.2 GPa·cm$^3$/g, or greater than 32.2 GPa·cm$^3$/g, with higher ratios being preferred. While $B_2O_3$ reduces density when it replaces alkaline earth oxides, $La_2O_3$ or $Al_2O_3$, Young's modulus decreases more rapidly. Thus, it is desirable to keep $B_2O_3$ content as low as reasonably possible. $B_2O_3$ also tends to decrease strain point and, for this reason also, the $B_2O_3$ content of the glass is preferably kept as low as possible.

As discussed above with regard to $SiO_2$, glass durability is also very important for LCD applications. Durability can be controlled somewhat by elevated concentrations of alkaline earths and lanthanum oxides, and significantly reduced by elevated $B_2O_3$ content. As with strain point and Young's modulus, it is desirable to keep $B_2O_3$ content low. Thus, to achieve the above properties, in one aspect, the glasses described herein have $B_2O_3$ concentrations that are less than or equal to 5.0 mole percent, between 1.0 and 5.0 mole percent, between 1.0 and 4.0 mole percent, or between 2.0 and 4.0 mole percent.

The $Al_2O_3$ and $B_2O_3$ concentrations can be selected as a pair to increase strain point, increase modulus, improve durability, reduce density, and reduce the coefficient of thermal expansion (CTE), while maintaining the melting and forming properties of the glass.

For example, an increase in $B_2O_3$ and a corresponding decrease in $Al_2O_3$ can be helpful in obtaining a lower density and CTE, while an increase in $Al_2O_3$ and a corresponding decrease in $B_2O_3$ can be helpful in increasing strain point, modulus, and durability, provided that the increase in $Al_2O_3$ does not reduce the $\Sigma(MgO+CaO+SrO+BaO)/(Al_2O_3)$ or $\Sigma(MgO+CaO+SrO+BaO+3La_2O_3)/(Al_2O_3)$ ratio below about 1.15. For example, as known in the art, glasses for use in AMLCD applications have CTE's (0-300° C.) in the range of 28-42×10$^{-7}$/° C., preferably, 30-40×10$^{-7}$/° C., and most preferably, 32-38×10$^{-7}$/° C. CTE's measured for other temperature ranges, e.g., 25-300° C. as in the examples presented below, can be transformed to the 0-300° C. range by adding an offset to the measured value. In the case of transforming CTE values measured for the 25-300° C. range to values for the 0-300° C. range, an offset of −0.8×10$^{-7}$/° C. has been found to work successfully for AMLCD silica-based glasses. With regard to CTE, historically, lamp glasses have had low boron and high alkaline earth contents (leading to high alkaline earth to alumina ratios), but these glasses have purposely had CTE's above 42×10$^{-7}$/° C. so that they would be compatible with molybdenum lead wires. Accordingly, the lamp glasses are not suitable for use in AMLCD applications.

In addition to the glass formers ($SiO_2$, $Al_2O_3$, and $B_2O_3$), the glasses described herein also include alkaline earth oxides. In one aspect, at least three alkaline earth oxides are part of the glass composition, e.g., MgO, CaO, and BaO, and, optionally, SrO. The alkaline earth oxides provide the glass with various properties important to melting, fining, forming, and ultimate use. Accordingly, to improve glass performance in these regards, in one aspect, the $\Sigma(MgO+CaO+SrO+BaO)/(Al_2O_3)$ ratio is greater than or equal to 1.15, greater than or equal to 1.2, or greater than or equal to 1.25. In another aspect, the $\Sigma(MgO+CaO+SrO+BaO)/(Al_2O_3)$ ratio is less than or equal to 1.55 or less than or equal to 1.50.

The concentrations of MgO, $La_2O_3$, or combinations thereof, in the glass and the $\Sigma(MgO+CaO+SrO+BaO+3La_2O_3)/(Al_2O_3)$ ratio of the glass, can influence glass performance, particularly meltability and fining. Accordingly, to improve glass performance in these regards, in one aspect, the $\Sigma(MgO+CaO+SrO+BaO+3La_2O_3)/(Al_2O_3)$ ratio is greater than or equal to 1.15, greater than or equal to 1.20, or greater than or equal to 1.25. In another aspect, the $\Sigma(MgO+CaO+SrO+BaO+3La_2O_3)/(Al_2O_3)$ ratio is greater than or equal to 1.15 and less than or equal to 1.55, or greater than or equal to 1.25 and less than or equal to 1.45.

For certain embodiments of this invention, MgO and $La_2O_3$ are treated as what is in effect a single compositional component. This is because their impact upon viscoelastic properties, liquidus temperatures and liquidus phase relationships are qualitatively very similar. The other alkaline earth oxides form feldspar minerals, notably anorthite ($CaAl_2Si_2O_8$) and celsian ($BaAl_2Si_2O_8$) and strontium-bearing solid solutions of same. Neither MgO nor $La_2O_3$ participate in these crystals to a significant degree. Therefore, when a feldspar crystal is already the liquidus phase, a superaddition of MgO or $La_2O_3$ actual serves to stabilize the liquid relative to the crystal and thus lower the liquidus temperature. At the same time, the viscosity curve typically becomes steeper, reducing melting temperatures while having little or no impact on low-temperature viscosities. In this sense, the addition of small amounts of MgO and/or $La_2O_3$ benefits melting by reducing melting temperatures, benefits forming by reducing liquidus temperatures and increasing liquidus viscosity, while preserving high strain point and, thus, low compaction.

The impact of MgO and $La_2O_3$ on these properties is similar, but their impact on other key glass properties is very different. $La_2O_3$ greatly increases density and mildly increases CTE relative to MgO. While Young's modulus typically increases when either is added to an aluminosilicate glass of the invention, the density increases so quickly with $La_2O_3$ content that the specific modulus (Young's modulus divided by density) decreases. It is desirable to have a specific modulus of at least 28 MPa·m$^3$/kg, a typical value for AMLCD substrates in order to avoid excessive sagging of the sheet during thermal processing. Young's modulus for the glasses of this invention range from about 77.6 to about 83 GPa, and thus when density is greater than about 2.75 g/cc the specific modulus will fall below the desired level. For this reason, it is necessary to constrain $La_2O_3$ to be no higher than necessary to produce the desired impact on viscoelastic properties. While MgO does not have this impact, at high concentrations it finds high solubility in the barium aluminosilicate celsian, and thus for liquidus purposes must be kept at or below a level comparable to that for $La_2O_3$.

By increasing the sum of $MgO+La_2O_3$, the liquidus temperature can rise and the liquidus viscosity can fall to a level such that the use of a high viscosity forming process (e.g., a fusion process) is compromised. Therefore, the amount of MgO and $La_2O_3$ can be adjusted accordingly to obtain the desired properties for glass formation. In terms of concentrations, when both are present, the combined concentration of $MgO+La_2O_3$ should be between 1.0 and 7.5 mole percent in order to achieve the various benefits described above. In another aspect, the MgO concentration is between 2.0 and 6.0 mole percent or between 3.0 and 6.0 mole percent, especially when MgO is used in the absence of $La_2O_3$. In a further aspect, the $La_2O_3$ concentration is preferably kept less than or equal to about 3.0 mole percent so as not to elevate the density of the glass.

Calcium oxide present in the glass composition can produce low liquidus temperatures (high liquidus viscosities), high strain points and moduli, and CTE's in the most desired ranges for flat panel applications, specifically, AMLCD applications. It also contributes favorably to chemical durability, and compared to other alkaline earth oxides, it is relatively inexpensive as a batch material. However, at high concentrations, CaO increases the density and CTE. Furthermore, at sufficiently low $SiO_2$ concentrations, CaO may stabilize anorthite, thus decreasing liquidus viscosity. Accordingly, in one aspect, the CaO concentration can be greater than or equal to 2.0 mole percent. In another aspect, the CaO concentration of the glass composition is less than or equal to 7.5 mole percent or is between 3.0 and 7.5 mole percent.

The remaining alkaline earth oxides SrO and BaO can both contribute to low liquidus temperatures (high liquidus viscosities) and, thus, the glasses described herein will typically contain at least one of these oxides. However, the selection and concentration of these oxides are selected in order to avoid an increase in CTE and density and a decrease in modulus and strain point. The relative proportions of SrO and BaO can be balanced so as to obtain a suitable combination of physical properties and liquidus viscosity such that the glass can be formed by a downdraw process.

To summarize the effects/roles of the central components of the glasses of the invention, $SiO_2$ is the basic glass former. $Al_2O_3$ and $B_2O_3$ are also glass formers and can be selected as a pair with, for example, an increase in $B_2O_3$ and a corresponding decrease in $Al_2O_3$ being used to obtain a lower density and CTE, while an increase in $Al_2O_3$ and a corresponding decrease in $B_2O_3$ being used in increasing strain point, modulus, and durability, provided that the increase in $Al_2O_3$ does not reduce the $RO/(Al_2O_3)$ or $(RO+3La_2O_3)/(Al_2O_3)$ ratio below about 1.15, where $RO=\Sigma(MgO+CaO+SrO+BaO)$. If the ratio goes too low, meltability is compromised, i.e., the melting temperature becomes too high. $B_2O_3$ can be used to bring the melting temperature down, but high levels of $B_2O_3$ compromise strain point.

In addition to meltability and strain point considerations, for AMLCD applications, the CTE of the glass should be compatible with that of silicon. To achieve such CTE values, the glasses of the invention control the RO content of the glass (or the $RO+3La_2O_3$ content for glasses that include $La_2O_3$). For a given $Al_2O_3$ content, controlling the RO content corresponds to controlling the $RO/Al_2O_3$ ratio (or the $(RO+3La_2O_3)/Al_2O_3$ ratio for glasses that include $La_2O_3$). In practice, glasses having suitable CTE's are produced if the $RO/Al_2O_3$ ratio (or the $(RO+3La_2O_3)/Al_2O_3$ ratio) is below about 1.55.

On top of these considerations, the glasses are preferably formable by a downdraw process, e.g., a fusion process, which means that the glass' liquidus viscosity needs to be relatively high. Individual alkaline earths play an important role in this regard since they can destabilize the crystalline phases that would otherwise form. BaO and SrO are particularly effective in controlling the liquidus viscosity and are included in the glasses of the invention for at least this purpose. As illustrated in the examples presented below, various combinations of the alkaline earths will produce glasses having high liquidus viscosities, with the total of the alkaline earths (and $La_2O_3$ when used) satisfying the $RO/Al_2O_3$ ratio (or the $(RO+3La_2O_3)/Al_2O_3$ ratio) constraints needed to achieve low melting temperatures, high strain points, and suitable CTE's.

In addition to the above components, the glass compositions described herein can include various other oxides to adjust various physical, melting, fining, and forming attributes of the glasses. Examples of such other oxides include, but are not limited to, $TiO_2$, MnO, $Fe_2O_3$, ZnO, $Nb_2O_5$, $MoO_3$, $Ta_2O_5$, $WO_3$, $Y_2O_3$, and $CeO_2$. In one aspect, the amount of each of these oxides can be less than or equal to 2.0 mole percent, and their total combined concentration can be less than or equal to 4.0 mole percent. The glass compositions described herein can also include various contaminants associated with batch materials and/or introduced into the glass by the melting, fining, and/or forming equipment used to produce the glass, particularly $Fe_2O_3$ and $ZrO_2$. The glasses can also contain $SnO_2$ either as a result of Joule melting using tin-oxide electrodes and/or through the batching of tin containing materials, e.g., $SnO_2$, SnO, $SnCO_3$, $SnC_2O_4$, etc.

The glass compositions are generally alkali free; however, the glasses can contain some alkali contaminants. In the case of AMLCD applications, it is desirable to keep the alkali levels below 0.1 mole percent to avoid having a negative impact on thin film transistor (TFT) performance through diffusion of alkali ions from the glass into the silicon of the TFT. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. In one aspect, the total alkali concentration is less than or equal to 0.07 mole percent.

As discussed above, $\Sigma(MgO+CaO+SrO+BaO)/(Al_2O_3)$ and $\Sigma(MgO+CaO+SrO+BaO+3La_2O_3)/(Al_2O_3)$ ratios greater than or equal to 1.15 improve fining, i.e., the removal of gaseous inclusions from the melted batch materials. This improvement allows for the use of more environmentally friendly fining packages. For example, on an oxide basis, the glass compositions described herein can have one or more or all of the following compositional characteristics:

an $As_2O_3$ concentration of at most 0.05 mole percent;
an $Sb_2O_3$ concentration of at most 0.05 mole percent;
a $SnO_2$ concentration of at most 0.2 mole percent.

$As_2O_3$ is an effective high temperature fining agent for AMLCD glasses, and in some aspects described herein, $As_2O_3$ is used for fining because of its superior fining properties. However, $As_2O_3$ is poisonous and requires special handling during the glass manufacturing process. Accordingly, in certain aspects, fining is performed without the use of substantial amounts of $As_2O_3$, i.e., the finished glass has at most 0.05 mole percent $As_2O_3$. In one aspect, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the strain point in comparison to glasses that use $As_2O_3$ or $SnO_2$ as a fining agent. Accordingly, in certain aspects, fining is performed without the use of substantial amounts of $Sb_2O_3$, i.e., the finished glass has at most 0.05 mole percent $Sb_2O_3$. In another aspect, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. Also, for many years, $SnO_2$ has been a component of AMLCD glasses through the use of tin oxide electrodes in the Joule melting of the batch materials for such glasses. The presence of $SnO_2$ in AMLCD glasses has not resulted in any known adverse effects in the use of these glasses in the manufacture of liquid crystal displays. However, high concentrations of $SnO_2$ are not preferred as this can result in the formation of crystalline defects in AMLCD glasses. In one aspect, the concentration of $SnO_2$ in the finished glass is less than or equal to 0.2 mole percent.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain aspects, maintaining the $\Sigma(MgO+CaO+SrO+BaO+3La_2O_3)/(Al_2O_3)$ ratio and individual alkaline earth and $La_2O_3$ concentrations within the ranges discussed above makes the fining process easier to perform and more effective.

The glasses described herein can be manufactured using various techniques known in the art. In one aspect, the glasses are made using a downdraw process such as, for example, a fusion downdraw process. In one aspect, described herein is a method for producing an alkali-free glass sheet by a downdraw process comprising selecting, melting, and fining batch materials so that the glass making up the sheets comprises $SiO_2$, $Al_2O_3$, $B_2O_3$, MgO, CaO and BaO, and, on an oxide basis, comprises:

a $\Sigma \leq (MgO+CaO+SrO+BaO)/(Al_2O_3)$ ratio greater than or equal to 1.15;

(ii) a MgO content greater than or equal to 2.0 mole percent;

a CaO content greater than or equal to 3.0 mole percent; and a BaO content greater than or equal to 1.0 mole percent, wherein:

the fining is performed without the use of substantial amounts of arsenic (and, optionally, without the use of substantial amounts of antimony); and a population of 50 sequential glass sheets produced by the downdraw process from the melted and fined batch materials has an average gaseous inclusion level of less than 0.10 gaseous inclusions/cubic centimeter, where each sheet in the population has a volume of at least 500 cubic centimeters.

U.S. Pat. No. 5,785,726 (Dorfeld et al.), U.S. Pat. No. 6,128,924 (Bange et al.), U.S. Pat. No. 5,824,127 (Bange et al.), and co-pending patent application Ser. No. 11/116,669 disclose processes for manufacturing arsenic free glasses.

In one aspect, the population of 50 sequential glass sheets produced by the downdraw process from the melted and fined batch materials has an average gaseous inclusion level of less than 0.05 gaseous inclusions/cubic centimeter, where each sheet in the population has a volume of at least 500 cubic centimeters.

The downdraw sheet drawing processes and, in particular, the fusion process described in U.S. Pat. Nos. 3,338,696 and 3,682,609 both to Dockerty, which are incorporated by reference, can be used herein. Compared to other forming processes, such as the float process, the fusion process is preferred for several reasons. First, glass substrates made from the fusion process do not require polishing. Current glass substrate polishing is capable of producing glass substrates having an average surface roughness greater than about 0.5 nm (Ra), as measured by atomic force microscopy. The glass substrates produced by the fusion process have an average surface roughness as measured by atomic force microscopy of less than 0.5 nm. The substrates also have an average internal stress as measured by optical retardation which is less than or equal to 150 psi.

To be formed by a downdraw process, it is desirable that the glass compositions described herein have a liquidus viscosity greater than or equal to 85,000 poises, greater than or equal to 100,000 poises, or greater than or equal to 150,000 poises, higher liquidus viscosities being preferable.

The glass compositions described herein can be used to make various glass articles. For example, the glass compositions described herein can be used to make substrates for liquid crystal displays such as, for example, AMLCDs. In one aspect, to be suitable for use in flat panel display applications such as, for example, AMLCDs, the glasses described herein have a value for (Young's modulus)/density >30.5 GPa·cm$^3$/g, a weight loss which is less than or equal to 0.8 milligrams/cm$^2$ when a polished sample is exposed to a 5% HCl solution for 24 hours at 95° C., and a weight loss of less than 1.5 milligrams/cm$^2$ when exposed to a solution of 1 volume of 50 wt. % HF and 10 volumes 40 wt. % $NH_4F$ at 30° C. for 5 minutes.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

Example 1

Preparation of a Test Sample

Test glass samples are made by melting appropriate batch materials in Pt crucibles at 1,600-1,650° C. for 6 or more hours, and pouring onto a steel sheet, followed by conventional annealing prior to cutting and polishing for testing. The resulting patty of glass is processed to yield rectangular or square glass samples roughly 3"×7"×2 mm thick or 4"×4"×2 mm thick. The glass rectangles or squares are heated to a temperature corresponding to a viscosity of 10$^{11}$ poise and held for four hours, followed by quick cooling to room temperature. This heat treatment is believed to give the best possible approximation to the thermal history of fusion drawn sheet. The samples are then polished on their flat surfaces, marked with sets of several fiducial marks near their edges (and perpendicular to the long axis of the sample in the case of rectangular samples). Rectangular samples are cut in half lengthwise, leaving one reference portion, and another portion that undergoes heat treatment(s). The reference piece and the heat-treated piece are examined together under a microscope, and dimensional changes are recorded. Dimensions of square samples are precisely measured before heat treatment using a Mitutoyo Quick Vision QV202 Pro instrument, followed by heat treatment(s) at appropriate times and temperatures, and re-measurement of sample dimensions. Because the automated optical instrument makes several tens of repeat measurements on each sample, statistical methods can be used to determine dimensional changes as low as 1 micron, corresponding to less than a 5 to 10 ppm dimensional change for the sample sizes used. Repeated heat treatments and measurements can be used to determine the dimensional relaxation behavior of a glass at a given temperature as a function of time.

FIG. 1 shows the results of compaction testing performed on a series of commercial and laboratory glasses to investigate the effects of strain point on compaction. As can be seen in this figure, the change in compaction with strain point is a non-linear phenomenon, with the largest improvement occurring over the 20° C. range between 660° C. and 680° C. In this regard, it should be noted that 660° C. is a typical strain point value for AMLCD glasses currently on the market. By increasing the strain point by just 20° C. to 680° C., the compaction drops from above 70 ppm to less than 30 ppm, i.e., an improvement of more than 50%. For some poly-Si processes, this improvement may be sufficient. For other processes, further improvements may be required. As illustrated in FIG. 1, increases in the strain point from 660° C. by 50-100° C. or more, achieve compaction levels of 20 ppm and below. These levels are suitable for poly-Si processes currently in use or expected to be used in the coming years.

Figure 2:
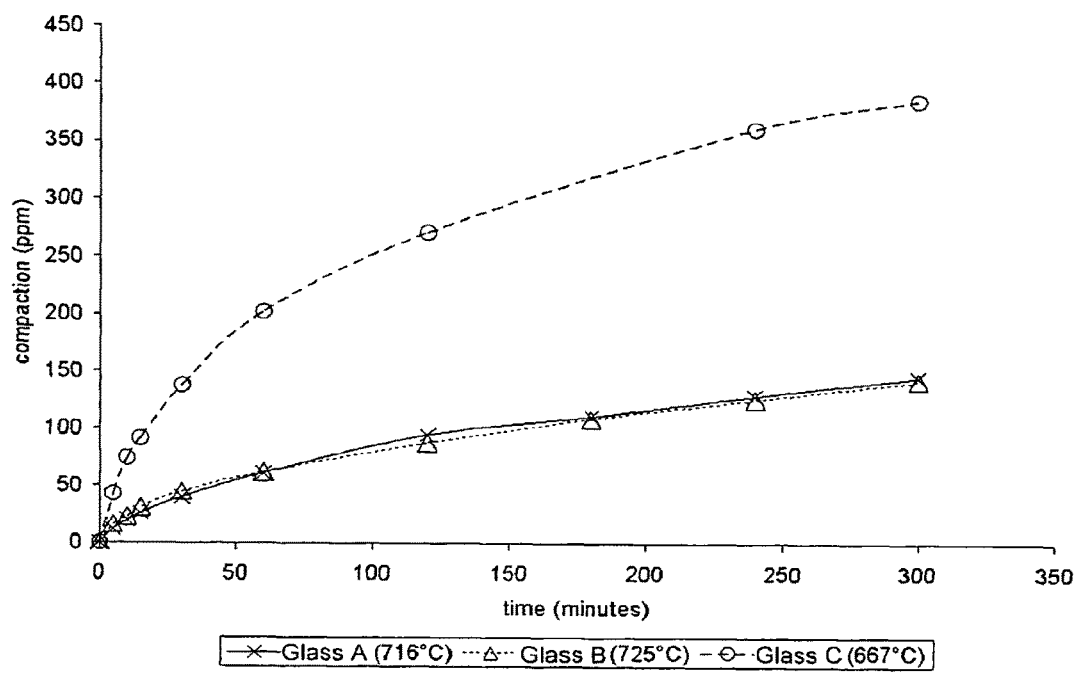
FIG. 2 shows the compaction behavior versus time of three glass samples given repeated heat treatments at a temperature of 600° C.

FIG. 2 shows the effects of repeated heat treatments on glasses having different strain points. Repeated heat treatments more accurately mimic the poly-Si manufacturing process than the single heat treatment used to generate the data of FIG. 1. For FIG. 2, each of three glasses, i.e., Glass A which corresponds to Example 68 of Table 1, Glass B which corresponds to Example 65 of Table 1, and Glass C which is Corning Eagle 2000F glass, was inserted in a furnace at 600° C. and held at temperature for increasing periods of time as the experiment continued. For the first heat treatment, the period was 5 minutes, for the second period it was an additional five minutes (for a total time of 10 minutes), and so forth as shown in Table 2, with the last four periods being for 60 minutes each. After each heat treatment, the glass sample was removed from the furnace and placed between two fans to achieve rapid cooling. In this way, the glass samples were basically subjected to step changes in their temperatures.

As can be seen in FIG. 2, for all three samples, the compaction per test period decreases with increasing time since the glass structure has relaxed based on its prior exposures to the 600° C. treatments. However, the glasses with higher strain points, i.e., Glasses A and B of the invention, exhibited markedly lower levels of compaction than Glass C which had a strain point characteristic of currently available AMLCD glasses. The data plotted in FIG. 2 is set forth in Table 2.

In addition to low compaction, the glass must satisfy rigorous forming requirements to be applicable to fusion draw or related processes. Devitrification is defined as the formation of a crystalline phase from an initially homogeneous glass. The maximum temperature at which crystals coexist with glass is defined as the liquidus temperature. As described below in connection with the testing of the glasses of Table 1, liquidus temperature is measured by loading a crushed glass sample into a platinum boat, then heating for 24 hours in a tube furnace with a gradient of 10° C. or less per cm. The viscosity of the glass at the liquidus temperature is referred to as the liquidus viscosity. Precision sheet glass forming processes generally require comparatively high liquidus viscosities, for example, greater than 40,000 poise, preferably, greater than 85,000 poise.

The glass must also satisfy rigorous melting requirements for production purposes. The temperature at which glass batch constituents melt in a economically reasonable amount of time, and the temperature at which trapped bubbles of air can rise out of the glass in a reasonable amount of time, typically corresponds to a viscosity of about 200 poises. Limitations in durable refractory or precious metal containers at high temperatures place an upper practical limit for 200 poises temperature of about 1,680° C. It is possible that changes in batch materials from those conventionally used would allow more viscous glasses to be melted at proportionately higher viscosities, but such materials invariably add formidable costs, and transporting glass through a melting and conditioning system at high viscosity presents significant technical challenges. Numerous glass compositions with their physical properties are presented in Table 1.

The glass properties set forth in Table 1 were determined in accordance with techniques conventional in the glass art. Thus, the linear coefficient of thermal expansion (CTE) over the temperature range 25-300° C. is expressed in terms of $\times 10^{-7}/°$ C. and the strain point is expressed in terms of ° C. These were determined from fiber elongation techniques (ASTM references E228-85 and C336, respectively).

The density in terms of grams/cm$^3$ was measured via the Archimedes method (ASTM C693).

The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs location can be well estimated, within 5-10° C. The temperature at which crystals are observed in the internal portion of the sample is taken to represent the liquidus of the glass (for the corresponding test period). Testing is sometimes carried out at longer times (e.g. 72 hours), in order to observe slower growing phases. The crystalline phase for the various glasses of Table 1 are described by the following abbreviations: anor—anorthite, a calcium aluminosilicate mineral; cris—cristobalite (SiO$_2$); cels—mixed alkaline earth celsian; Sr/Al sil—a strontium aluminosilicate phase; SrSi—a strontium silicate phase. The liquidus viscosity in poises was determined from the liquidus temperature and the coefficients of the Fulcher equation.

Young's modulus values in terms of Gpa were determined using a resonant ultrasonic spectroscopy technique of the general type set forth in ASTM E1875-00e1.

As can be seen in Table 1, Examples 1-88 have densities, CTE's, strain points, and Young's modulus values that make the glasses suitable for use in display applications, such as AMLCD applications. Although not shown in Table 1, the glasses also have chemical durabilities suitable for these applications. In particular, Examples 68, 69, 70, and 71 were each found to have weight loss values when immersed in 10 wt. % HF for 20 minutes at room temperature of between 6.7 and 7.5 milligrams/cm$^2$. For comparison, commercial AMLCD glasses show weight losses in the range of 5-8 milligrams/cm$^2$ when tested in this manner. The glasses of all the examples can be formed using downdraw techniques, such as the fusion technique. Thus, they have liquidus temperatures less than or equal to 1250° C. and liquidus viscosities equal to or greater than 85,000 poises, and in most cases, equal to or greater than 150,000 poises.

Glasses having the composition and properties shown in Examples 71 and 79 are currently regarded as representing the most preferred embodiments of the invention, that is, as providing the best combination of properties for the purposes of the invention at this time.

Throughout this application, various publications are referenced. The disclosures of these publications in their entireties are hereby incorporated by reference into this application in order to more fully describe the compounds, compositions and methods described herein.

Various modifications and variations can be made to the materials, methods, and articles described herein. Other aspects of the materials, methods, and articles described herein will be apparent from consideration of the specification and practice of the materials, methods, and articles disclosed herein. It is intended that the specification and examples be considered as exemplary.

TABLE 1

| Mol % | min | max | 1 | 2 | 3 | 4 |
|---|---|---|---|---|---|---|
| $SiO_2$ | 66.58 | 70.69 | 67.63 | 66.58 | 68.76 | 67.61 |
| $Al_2O_3$ | 11.75 | 13.51 | 12.15 | 12.14 | 11.76 | 11.89 |
| $B_2O_3$ | 1.25 | 4.96 | 3.98 | 3.99 | 4.96 | 3.94 |
| MgO | 0.84 | 7.48 | 5.28 | 5.66 | 3.02 | 5.42 |
| CaO | 2.99 | 5.89 | 5.28 | 5.66 | 5.57 | 5.42 |
| SrO | 0.00 | 4.29 | 0.00 | 1.96 | 0.68 | 1.88 |
| BaO | 1.30 | 5.55 | 5.28 | 3.77 | 5.00 | 3.60 |
| $La_2O_3$ | 0.00 | 3.01 | 0.00 | 0.00 | 0.00 | 0.00 |
| $As_2O_3$ | 0.00 | 0.40 | 0.40 | 0.25 | 0.25 | 0.25 |
| $Sb_2O_3$ | 0.00 | 0.49 | 0.00 | 0.00 | 0.00 | 0.00 |
| $ZrO_2$ | 0.00 | 0.02 | 0.00 | 0.00 | 0.00 | 0.00 |
| $SnO_2$ | 0.00 | 0.08 | 0.00 | 0.00 | 0.00 | 0.00 |
| MgO + $La_2O_3$ | 2.35 | 7.48 | 5.28 | 5.66 | 3.02 | 5.42 |
| Sum(RO + La2/3O)* | 14.27 | 18.39 | 15.84 | 17.05 | 14.27 | 16.32 |
| Sum(RO + La2/3O)/$Al_2O_3$ | 1.15 | 1.41 | 1.30 | 1.40 | 1.21 | 1.37 |
| Strain Point (° C.) | 695 | 739 | — | 706 | 715 | 702 |
| CTE (x10–7/° C.) | 35.8 | 39.6 | — | 39 | 37.6 | 38.5 |
| density | 2.571 | 2.842 | 2.631 | 2.628 | 2.610 | 2.619 |
| Young's modulus (Gpa) | 77.6 | 82.6 | — | — | 78.1 | — |
| specific modulus | 29.1 | 31.5 | — | — | 29.9 | — |
| 200 poise T (° C.) | 1585 | 1672 | — | 1585 | 1665 | 1605 |
| Liquidus T (° C.) | 1110 | 1250 | 1110 | 1115 | 1120 | 1125 |
| Liquidus phase | — | — | cels | cris | anor | anor |
| Liquidus Viscosity | 1.09E+05 | 1.08E+06 | — | 4.59E+05 | 1.08E+06 | 4.48E+05 |

| Mol % | 5 | 6 | 7 | 8 | 9 | 10 |
|---|---|---|---|---|---|---|
| $SiO_2$ | 67.43 | 68.90 | 67.95 | 67.20 | 69.81 | 69.59 |
| $Al_2O_3$ | 11.75 | 12.02 | 12.03 | 11.89 | 11.89 | 11.99 |
| $B_2O_3$ | 3.93 | 3.82 | 3.94 | 3.99 | 4.00 | 3.94 |
| MgO | 5.48 | 4.15 | 5.23 | 5.54 | 2.70 | 3.05 |
| CaO | 5.48 | 5.78 | 5.23 | 5.54 | 5.81 | 5.78 |
| SrO | 1.89 | 1.04 | 0.00 | 1.92 | 0.89 | 0.93 |
| BaO | 3.64 | 4.29 | 5.23 | 3.68 | 4.90 | 4.72 |
| $La_2O_3$ | 0.00 | 0.00 | 0.00 | 0.00 | 0.00 | 0.00 |
| $As_2O_3$ | 0.40 | 0.00 | 0.39 | 0.25 | 0.00 | 0.00 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| MgO + $La_2O_3$ | 5.48 | 4.15 | 5.23 | 5.54 | 2.70 | 3.05 |
| Sum(RO + La2/3O) | 16.49 | 15.26 | 15.69 | 16.68 | 14.30 | 14.48 |
| Sum(RO + La2/3O)/$Al_2O_3$ | 1.40 | 1.27 | 1.30 | 1.40 | 1.20 | 1.21 |
| Strain Point (° C.) | 703 | 705 | — | 706 | 701 | 705 |
| CTE (x10–7/° C.) | 37.6 | 37.5 | — | 39.4 | — | 37.2 |
| density | 2.611 | 2.598 | 2.628 | 2.616 | 2.593 | 2.593 |
| Young's modulus (Gpa) | 80 | — | — | — | — | — |
| specific modulus | 30.6 | — | — | — | — | — |
| 200 poise T (° C.) | 1618 | 1642 | — | 1601 | — | 1664 |
| Liquidus T (° C.) | 1125 | 1130 | 1130 | 1130 | 1135 | 1135 |
| Liquidus phase | anor | anor | cels | anor | anor + cris | anor |
| Liquidus Viscosity | 4.78E+05 | 5.78E+05 | — | 3.43E+05 | — | 6.64E+05 |

TABLE 1-continued

| Mol % | 11 | 12 | 13 | 14 | 15 | 16 |
|---|---|---|---|---|---|---|
| $SiO_2$ | 70.69 | 69.83 | 69.76 | 69.36 | 68.01 | 67.93 |
| $Al_2O_3$ | 12.48 | 11.89 | 11.95 | 11.96 | 12.49 | 12.37 |
| $B_2O_3$ | 4.72 | 3.97 | 4.00 | 3.90 | 3.94 | 3.94 |
| MgO | 0.84 | 2.70 | 2.78 | 3.90 | 5.09 | 5.16 |
| CaO | 4.69 | 5.80 | 5.77 | 5.70 | 5.09 | 5.16 |
| SrO | 1.36 | 0.89 | 0.89 | 0.88 | 1.76 | 1.79 |
| BaO | 3.71 | 4.92 | 4.85 | 4.30 | 3.38 | 3.41 |
| $La_2O_3$ | 1.51 | 0.00 | 0.00 | 0.00 | 0.00 | 0.00 |
| $As_2O_3$ | 0.00 | 0.00 | 0.00 | 0.00 | 0.25 | 0.25 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $MgO + La_2O_3$ | 2.35 | 2.70 | 2.78 | 3.90 | 5.09 | 5.16 |
| $Sum(RO + La2/3O)$ | 15.13 | 14.31 | 14.29 | 14.78 | 15.32 | 15.52 |
| $Sum(RO + La2/3O)/Al_2O_3$ | 1.21 | 1.20 | 1.20 | 1.24 | 1.23 | 1.25 |
| Strain Point (° C.) | 719 | 703 | 704 | 698 | 708 | 707 |
| CTE (×10−7/° C.) | 36.7 | 37.1 | — | 37.3 | 37 | 37.6 |
| density | 2.673 | 2.592 | — | 2.595 | 2.597 | 2.600 |
| Young's modulus (Gpa) | 77.7 | 77.63 | — | 79.01 | — | — |
| specific modulus | 29.1 | 29.9 | — | 30.5 | — | — |
| 200 poise T (° C.) | 1648.19 | 1672 | 1672 | 1651 | 1624 | 1620 |
| Liquidus T (° C.) | 1140 | 1140 | 1140 | 1140 | 1140 | 1140 |
| Liquidus phase | cris | anor | anor | anor | anor | anor |
| Liquidus Viscosity | 7.01E+05 | 7.11E+05 | 6.53E+05 | 4.81E+05 | 4.19E+05 | 3.78E+05 |

| Mol % | 17 | 18 | 19 | 20 | 21 | 22 |
|---|---|---|---|---|---|---|
| $SiO_2$ | 67.85 | 68.26 | 66.89 | 70.25 | 67.69 | 69.80 |
| $Al_2O_3$ | 12.25 | 11.91 | 12.01 | 12.99 | 12.01 | 13.51 |
| $B_2O_3$ | 3.94 | 3.91 | 3.99 | 4.52 | 3.94 | 4.32 |
| MgO | 5.22 | 5.18 | 5.60 | 0.88 | 5.36 | 0.90 |
| CaO | 5.22 | 5.18 | 5.60 | 4.37 | 5.36 | 4.06 |
| SrO | 1.81 | 0.00 | 1.94 | 1.26 | 1.85 | 1.16 |
| BaO | 3.47 | 5.18 | 3.73 | 3.47 | 3.55 | 3.24 |
| $La_2O_3$ | 0.00 | 0.00 | 0.00 | 2.26 | 0.00 | 3.01 |
| $As_2O_3$ | 0.25 | 0.39 | 0.25 | 0.00 | 0.25 | 0.00 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $MgO + La_2O_3$ | 5.22 | 5.18 | 5.60 | 3.14 | 5.36 | 3.91 |
| $Sum(RO + La2/3O)$ | 15.72 | 15.54 | 16.87 | 16.76 | 16.12 | 18.39 |
| $Sum(RO + La2/3O)/Al_2O_3$ | 1.28 | 1.30 | 1.40 | 1.29 | 1.34 | 1.36 |
| Strain Point (° C.) | 703 | — | 703 | 725 | 705 | 729 |
| CTE (×10−7/° C.) | 37.8 | — | 39.6 | 37.2 | 38.7 | 39.3 |
| Density | 2.605 | 2.622 | 2.623 | 2.723 | 2.598 | 2.842 |
| Young's modulus (Gpa) | — | — | — | 79.57 | — | 82.6 |
| specific modulus | — | — | — | 29.2 | — | 29.1 |
| 200 poise T (° C.) | 1609 | — | 1606 | 1620 | 1600 | 1586 |
| Liquidus T (° C.) | 1140 | 1140 | 1140 | 1145 | 1145 | 1150 |
| Liquidus phase | anor | cels | anor | cris | cris | cris |
| Liquidus Viscosity | 3.63E+05 | — | 2.78E+05 | 4.78E+05 | 2.56E+05 | 3.02E+05 |

| Mol % | 23 | 24 | 25 | 26 | 27 | 28 |
|---|---|---|---|---|---|---|
| $SiO_2$ | 68.29 | 67.77 | 68.28 | 68.38 | 68.38 | 68.20 |
| $Al_2O_3$ | 12.11 | 12.13 | 12.07 | 12.04 | 12.04 | 11.89 |
| $B_2O_3$ | 3.68 | 3.94 | 2.69 | 2.99 | 2.99 | 2.99 |
| MgO | 4.46 | 5.29 | 5.30 | 5.45 | 5.45 | 5.54 |
| CaO | 5.82 | 5.29 | 5.78 | 5.45 | 5.45 | 5.54 |
| SrO | 1.44 | 1.83 | 1.92 | 1.09 | 0.00 | 1.92 |
| BaO | 4.20 | 3.51 | 3.64 | 4.36 | 5.45 | 3.68 |
| $La_2O_3$ | 0.00 | 0.00 | 0.00 | 0.00 | 0.00 | 0.00 |
| $As_2O_3$ | 0.00 | 0.25 | 0.26 | 0.25 | 0.25 | 0.25 |
| $Sb_2O_3$ | 0.00 | 0.00 | 0.00 | 0.00 | 0.00 | 0.00 |
| $ZrO_2$ | 0.00 | 0.00 | 0.02 | 0.00 | 0.00 | 0.00 |
| $SnO_2$ | 0.00 | 0.00 | 0.03 | 0.00 | 0.00 | 0.00 |
| $MgO + La_2O_3$ | 4.46 | 5.29 | 5.30 | 5.45 | 5.45 | 5.54 |
| $Sum(RO + La2/3O)$ | 15.92 | 15.92 | 16.64 | 16.35 | 16.35 | 16.68 |
| $Sum(RO + La2/3O)/Al_2O_3$ | 1.31 | 1.31 | 1.38 | 1.36 | 1.36 | 1.40 |
| Strain Point (° C.) | 698 | 705 | — | — | — | 715 |
| CTE (×10−7/° C.) | 37.9 | 37.3 | — | — | — | 39.2 |
| Density | 2.602 | 2.607 | — | 2.627 | 2.655 | 2.631 |
| Young's modulus (Gpa) | 79.98 | — | — | — | — | — |
| specific modulus | 30.7 | — | — | — | — | — |
| 200 poise T (° C.) | 1635 | 1611 | 1611 | — | — | 1614 |
| Liquidus T (° C.) | 1150 | 1150 | 1150 | 1150 | 1150 | 1150 |

TABLE 1-continued

| | | | | | | |
|---|---|---|---|---|---|---|
| Liquidus phase | anor | anor | cris | cris + cels | cels | anor |
| Liquidus Viscosity | 3.39E+05 | 2.56E+05 | 2.27E+05 | — | — | 2.91E+05 |

| Mol % | 29 | 30 | 31 | 32 | 33 | 34 |
|---|---|---|---|---|---|---|
| $SiO_2$ | 68.38 | 68.38 | 67.74 | 68.38 | 69.53 | 68.53 |
| $Al_2O_3$ | 12.04 | 12.04 | 12.08 | 12.04 | 11.95 | 12.15 |
| $B_2O_3$ | 2.99 | 2.99 | 2.99 | 2.99 | 3.93 | 3.69 |
| MgO | 5.45 | 5.45 | 5.63 | 5.68 | 3.12 | 5.08 |
| CaO | 5.45 | 5.45 | 5.63 | 4.98 | 5.46 | 5.08 |
| SrO | 1.56 | 1.82 | 1.95 | 2.13 | 2.37 | 0.00 |
| BaO | 3.89 | 3.63 | 3.74 | 3.55 | 3.39 | 5.08 |
| $La_2O_3$ | 0.00 | 0.00 | 0.00 | 0.00 | 0.00 | 0.00 |
| $As_2O_3$ | 0.25 | 0.25 | 0.25 | 0.25 | 0.25 | 0.40 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $MgO + La_2O_3$ | 5.45 | 5.45 | 5.63 | 5.68 | 3.12 | 5.08 |
| $Sum(RO + La2/3O)$ | 16.35 | 16.35 | 16.95 | 16.34 | 14.34 | 15.24 |
| $Sum(RO + La2/3O)/Al_2O_3$ | 1.36 | 1.36 | 1.40 | 1.36 | 1.20 | 1.25 |
| Strain Point (° C.) | — | — | 715 | — | 717 | 703 |
| CTE (×10−7/° C.) | — | — | 39.2 | — | 38 | 38 |
| density | 2.620 | 2.628 | 2.636 | 2.617 | 2.595 | 2.620 |
| Young's modulus (Gpa) | — | — | — | — | — | — |
| specific modulus | — | — | — | — | — | — |
| 200 poise T (° C.) | — | — | 1609 | — | 1664 | — |
| Liquidus T (° C.) | 1155 | 1155 | 1155 | 1155 | 1160 | 1160 |
| Liquidus phase | cels | anor | anor | anor | anor | cels |
| Liquidus Viscosity | — | — | 2.37E+05 | — | 3.68E+05 | — |

| Mol % | 35 | 36 | 37 | 38 | 39 | 40 |
|---|---|---|---|---|---|---|
| $SiO_2$ | 68.70 | 68.38 | 67.53 | 67.53 | 67.86 | 68.38 |
| $Al_2O_3$ | 12.20 | 12.04 | 11.77 | 11.77 | 12.23 | 12.04 |
| $B_2O_3$ | 2.89 | 2.99 | 3.89 | 3.89 | 2.73 | 2.99 |
| MgO | 5.16 | 5.45 | 5.49 | 5.99 | 5.98 | 6.02 |
| CaO | 5.83 | 5.45 | 5.49 | 4.49 | 5.24 | 4.29 |
| SrO | 1.46 | 1.82 | 3.09 | 1.90 | 1.95 | 2.58 |
| BaO | 3.76 | 3.63 | 2.49 | 4.19 | 3.69 | 3.44 |
| $La_2O_3$ | 0.00 | 0.00 | 0.00 | 0.00 | 0.00 | 0.00 |
| $As_2O_3$ | 0.00 | 0.25 | 0.25 | 0.25 | 0.26 | 0.25 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.02 | 0.00 |
| $SnO_2$ | 0.00 | 0.00 | 0.00 | 0.00 | 0.03 | 0.00 |
| $MgO + La_2O_3$ | 5.16 | 5.45 | 5.49 | 5.99 | 5.98 | 6.02 |
| $Sum(RO + La2/3O)$ | 16.21 | 16.35 | 16.56 | 16.57 | 16.86 | 16.33 |
| $Sum(RO + La2/3O)/Al_2O_3$ | 1.33 | 1.36 | 1.41 | 1.41 | 1.38 | 1.36 |
| Strain Point (° C.) | 712 | — | 707 | — | — | — |
| CTE (×10−7/° C.) | 37.9 | — | 38.7 | — | — | — |
| density | 2.607 | 2.619 | 2.608 | 2.630 | 2.618 | 2.624 |
| Young's modulus (Gpa) | 81.15 | — | — | — | — | — |
| specific modulus | 31.1 | — | — | — | — | — |
| 200 poise T (° C.) | 1629 | — | 1601 | — | — | — |
| Liquidus T (° C.) | 1160 | 1160 | 1160 | 1160 | 1160 | 1160 |
| Liquidus phase | anor | cris | anor | cels | anor | cris + anor |
| Liquidus Viscosity | 2.68E+05 | — | 1.66E+05 | — | — | — |

| Mol % | 41 | 42 | 43 | 44 | 45 | 46 |
|---|---|---|---|---|---|---|
| $SiO_2$ | 67.53 | 68.38 | 67.73 | 67.27 | 68.38 | 68.34 |
| $Al_2O_3$ | 11.77 | 12.04 | 12.23 | 12.27 | 12.04 | 12.22 |
| $B_2O_3$ | 3.89 | 2.99 | 3.19 | 2.99 | 2.99 | 2.60 |
| MgO | 6.48 | 4.67 | 5.27 | 5.72 | 4.99 | 5.37 |
| CaO | 5.49 | 5.84 | 5.89 | 5.72 | 5.68 | 5.85 |
| SrO | 0.90 | 1.17 | 2.06 | 1.98 | 2.12 | 1.95 |
| BaO | 3.69 | 4.67 | 3.63 | 3.81 | 3.55 | 3.68 |
| $La_2O_3$ | 0.00 | 0.00 | 0.00 | 0.00 | 0.00 | 0.00 |
| $As_2O_3$ | 0.25 | 0.25 | 0.00 | 0.25 | 0.25 | 0.00 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| $MgO + La_2O_3$ | 6.48 | 4.67 | 5.27 | 5.72 | 4.99 | 5.37 |
| $Sum(RO + La2/3O)$ | 16.56 | 16.35 | 16.85 | 17.23 | 16.34 | 16.85 |
| $Sum(RO + La2/3O)/Al_2O_3$ | 1.41 | 1.36 | 1.38 | 1.40 | 1.36 | 1.38 |
| Strain Point (° C.) | — | — | 703 | 719 | — | 715 |
| CTE (×10−7/° C.) | — | — | 37.9 | 38.6 | — | 37.9 |
| density | 2.600 | 2.642 | 2.601 | 2.640 | 2.623 | 2.609 |
| Young's modulus (Gpa) | — | — | 81.63 | — | — | 82.12 |
| specific modulus | — | — | 31.4 | — | — | 31.5 |
| 200 poise T (° C.) | — | — | 1618 | 1603 | — | 1626 |

TABLE 1-continued

| | | | | | | |
|---|---|---|---|---|---|---|
| Liquidus T (° C.) | 1160 | 1165 | 1165 | 1165 | 1170 | 1170 |
| Liquidus phase | cels | anor | anor | anor | cris | anor |
| Liquidus Viscosity | — | — | 2.00E+05 | 1.70E+05 | — | 2.12E+05 |

| Mol % | 47 | 48 | 49 | 50 | 51 | 52 |
|---|---|---|---|---|---|---|
| $SiO_2$ | 67.53 | 67.53 | 67.53 | 68.38 | 67.97 | 68.38 |
| $Al_2O_3$ | 11.77 | 11.77 | 11.77 | 12.04 | 12.23 | 12.04 |
| $B_2O_3$ | 3.89 | 3.89 | 3.89 | 2.99 | 2.90 | 2.99 |
| MgO | 5.49 | 6.48 | 6.48 | 5.84 | 5.30 | 6.52 |
| CaO | 5.49 | 4.49 | 5.49 | 4.67 | 5.89 | 3.27 |
| SrO | 4.29 | 1.90 | 0.00 | 1.17 | 2.04 | 3.27 |
| BaO | 1.30 | 3.69 | 4.59 | 4.67 | 3.67 | 3.27 |
| $La_2O_3$ | 0.00 | 0.00 | 0.00 | 0.00 | 0.00 | 0.00 |
| $As_2O_3$ | 0.25 | 0.25 | 0.25 | 0.25 | 0.00 | 0.25 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| MgO + $La_2O_3$ | 5.49 | 6.48 | 6.48 | 5.84 | 5.30 | 6.52 |
| Sum(RO + La2/3O) | 16.57 | 16.56 | 16.56 | 16.35 | 16.90 | 16.33 |
| Sum(RO + La2/3O)/$Al_2O_3$ | 1.41 | 1.41 | 1.41 | 1.36 | 1.38 | 1.36 |
| Strain Point (° C.) | 704 | — | — | — | 713 | — |
| CTE (×10−7/° C.) | 38.7 | — | — | — | 37.9 | — |
| Density | 2.594 | 2.621 | 2.614 | 2.634 | 2.606 | 2.625 |
| Young's modulus (Gpa) | — | — | — | — | 82.05 | — |
| specific modulus | — | — | — | — | 31.5 | — |
| 200 poise T (° C.) | 1588 | — | — | — | 1628 | — |
| Liquidus T (° C.) | 1170 | 1170 | 1170 | 1175 | 1180 | 1180 |
| Liquidus phase | anor | cels | cels | cels | anor | cels |
| Liquidus Viscosity | 1.11E+05 | — | — | — | 1.66E+05 | — |

| Mol % | 53 | 54 | 55 | 56 | 57 | 58 |
|---|---|---|---|---|---|---|
| $SiO_2$ | 68.76 | 68.38 | 68.38 | 67.53 | 67.53 | 68.38 |
| $Al_2O_3$ | 12.26 | 12.04 | 12.04 | 11.77 | 11.77 | 12.04 |
| $B_2O_3$ | 2.56 | 2.99 | 2.99 | 3.89 | 3.89 | 2.99 |
| MgO | 5.35 | 5.71 | 6.11 | 7.38 | 7.48 | 6.35 |
| CaO | 5.80 | 4.09 | 4.09 | 5.49 | 3.49 | 3.63 |
| SrO | 1.57 | 3.27 | 2.04 | 0.00 | 1.90 | 2.72 |
| BaO | 3.70 | 3.27 | 4.09 | 3.69 | 3.69 | 3.63 |
| $La_2O_3$ | 0.00 | 0.00 | 0.00 | 0.00 | 0.00 | 0.00 |
| $As_2O_3$ | 0.00 | 0.25 | 0.25 | 0.25 | 0.25 | 0.25 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| MgO + $La_2O_3$ | 5.35 | 5.71 | 6.11 | 7.38 | 7.48 | 6.35 |
| Sum(RO + La2/3O) | 16.42 | 16.34 | 16.33 | 16.56 | 16.56 | 16.33 |
| Sum(RO + La2/3O)/$Al_2O_3$ | 1.34 | 1.36 | 1.36 | 1.41 | 1.41 | 1.36 |
| Strain Point (° C.) | 714 | — | — | — | — | — |
| CTE (×10−7/° C.) | 37.9 | — | — | — | — | — |
| Density | 2.612 | 2.627 | 2.625 | 2.579 | 2.606 | 2.627 |
| Young's modulus (Gpa) | 81.63 | — | — | — | — | — |
| specific modulus | 31.3 | — | — | — | — | — |
| 200 poise T (° C.) | 1631 | — | — | — | — | — |
| Liquidus T (° C.) | 1185 | 1190 | 1190 | 1190 | 1190 | 1195 |
| Liquidus phase | anor | Batch stone with cris + cels | cris | cris | cels | cris |
| Liquidus Viscosity | 1.60E+05 | — | — | — | — | — |

| Mol % | 59 | 60 | 61 | 62 | 63 | 64 |
|---|---|---|---|---|---|---|
| $SiO_2$ | 68.53 | 69.53 | 68.38 | 68.38 | 67.63 | 67.63 |
| $Al_2O_3$ | 12.15 | 11.95 | 12.04 | 12.04 | 12.15 | 12.15 |
| $B_2O_3$ | 3.69 | 3.93 | 2.99 | 2.99 | 3.98 | 3.98 |
| MgO | 6.27 | 3.12 | 4.90 | 4.09 | 6.87 | 5.28 |
| CaO | 2.99 | 5.46 | 4.90 | 5.71 | 2.99 | 5.28 |
| SrO | 2.99 | 3.97 | 3.27 | 3.27 | 2.99 | 0.00 |
| BaO | 2.99 | 1.80 | 3.27 | 3.27 | 2.99 | 5.28 |
| $La_2O_3$ | 0.00 | 0.00 | 0.00 | 0.00 | 0.00 | 0.00 |
| $As_2O_3$ | 0.40 | 0.25 | 0.25 | 0.25 | 0.40 | 0.40 |
| $Sb_2O_3$ | 0.00 | 0.00 | 0.00 | 0.00 | 0.00 | 0.00 |
| $ZrO_2$ | 0.00 | 0.00 | 0.00 | 0.00 | 0.00 | 0.00 |
| $SnO_2$ | 0.00 | 0.00 | 0.00 | 0.00 | 0.00 | 0.00 |
| MgO + $La_2O_3$ | 6.27 | 3.12 | 4.90 | 4.09 | 6.87 | 5.28 |
| Sum(RO + La2/3O) | 15.24 | 14.35 | 16.34 | 16.34 | 15.84 | 15.84 |
| Sum(RO + La2/3O)/$Al_2O_3$ | 1.25 | 1.20 | 1.36 | 1.36 | 1.30 | 1.30 |
| Strain Point (° C.) | 709 | 721 | — | — | 702 | 694.5 |
| CTE (×10−7/° C.) | 36.2 | 36.9 | — | — | 36.2 | 38.6 |
| density | 2.602 | 2.571 | 2.640 | 2.642 | 2.610 | 2.638 |

TABLE 1-continued

| | | | | | | |
|---|---|---|---|---|---|---|
| Young's modulus (Gpa) | — | — | — | — | — | — |
| specific modulus | — | — | — | — | — | — |
| 200 poise T (° C.) | — | 1648 | — | — | — | — |
| Liquidus T (° C.) | 1200 | 1205 | 1215 | 1220 | 1230 | 1250 |
| Liquidus phase | Sr/Al sil | anor | anor | anor | SrSi | cels |
| Liquidus Viscosity | — | 1.22E+05 | — | — | — | — |

| Mol % | 65 | 66 | 67 | 68 | 69 | 70 |
|---|---|---|---|---|---|---|
| $SiO_2$ | 69.12 | 69.43 | 69.43 | 68.61 | 69.22 | 69.41 |
| $Al_2O_3$ | 12.01 | 11.88 | 11.87 | 12.67 | 12.21 | 12.46 |
| $B_2O_3$ | 2.01 | 2.00 | 2.00 | 2.23 | 2.00 | 2.00 |
| MgO | 5.61 | 5.55 | 5.95 | 5.25 | 5.42 | 5.22 |
| CaO | 5.61 | 5.55 | 4.76 | 5.59 | 5.42 | 5.22 |
| SrO | 1.59 | 0.00 | 1.19 | 1.50 | 1.53 | 1.48 |
| BaO | 4.01 | 5.55 | 4.76 | 3.59 | 3.73 | 3.73 |
| $La_2O_3$ | 0.00 | 0.00 | 0.00 | 0.00 | 0.00 | 0.00 |
| $As_2O_3$ | 0.00 | 0.00 | 0.00 | 0.00 | 0.00 | 0.00 |
| $Sb_2O_3$ | 0.00 | 0.00 | 0.00 | 0.48 | 0.40 | 0.40 |
| $ZrO_2$ | 0.02 | 0.02 | 0.02 | 0.00 | 0.00 | 0.02 |
| $SnO_2$ | 0.02 | 0.02 | 0.02 | 0.08 | 0.07 | 0.07 |
| MgO + $La_2O_3$ | 5.61 | 5.55 | 5.95 | 5.25 | 5.42 | 5.22 |
| Sum(RO + La2/3O) | 16.82 | 16.65 | 16.66 | 15.93 | 16.10 | 15.65 |
| Sum(RO + La2/3O)/$Al_2O_3$ | 1.40 | 1.40 | 1.40 | 1.26 | 1.32 | 1.26 |
| Strain Point (° C.) | 733 | 736 | 736 | 728 | 727 | 730 |
| CTE (×10−7/° C.) | 38.9 | 38.5 | 38.0 | 37.0 | 37.9 | 36.8 |
| density | 2.630 | 2.640 | 2.643 | 2.637 | 2.640 | 2.635 |
| Young's modulus (Gpa) | — | — | — | 81.4 | 81.4 | 81.4 |
| specific modulus | — | — | — | 30.9 | 30.8 | 30.9 |
| 200 poise T (° C.) | 1633 | 1657 | 1652 | 1639 | 1644 | 1649 |
| Liquidus T (° C.) | 1155 | 1160 | 1155 | 1185 | 1170 | 1180 |
| Liquidus phase | cels | cels | cels | cels | cels | cels |
| Liquidus Viscosity | 2.60E+05 | 3.50E+05 | 4.29E+05 | 1.98E+05 | 2.87E+05 | 2.63E+05 |

| Mol % | 71 | 72 | 73 | 74 | 75 | 76 |
|---|---|---|---|---|---|---|
| $SiO_2$ | 69.38 | 69.47 | 69.37 | 69.77 | 69.85 | 69.85 |
| $Al_2O_3$ | 12.44 | 12.55 | 13.07 | 12.87 | 12.83 | 12.88 |
| $B_2O_3$ | 1.99 | 2.00 | 2.00 | 2.00 | 2.00 | 2.00 |
| MgO | 5.21 | 5.05 | 5.24 | 4.93 | 4.93 | 4.93 |
| CaO | 5.21 | 5.22 | 4.81 | 4.93 | 4.93 | 4.93 |
| SrO | 1.48 | 1.47 | 0.75 | 1.64 | 1.40 | 1.62 |
| BaO | 3.72 | 3.68 | 4.20 | 3.30 | 3.50 | 3.30 |
| $La_2O_3$ | 0.00 | 0.00 | 0.00 | 0.00 | 0.00 | 0.00 |
| $As_2O_3$ | 0.00 | 0.00 | 0.00 | 0.00 | 0.00 | 0.00 |
| $Sb_2O_3$ | 0.48 | 0.47 | 0.47 | 0.47 | 0.47 | 0.40 |
| $ZrO_2$ | 0.02 | 0.02 | 0.02 | 0.02 | 0.02 | 0.02 |
| $SnO_2$ | 0.07 | 0.07 | 0.07 | 0.07 | 0.07 | 0.07 |
| MgO + $La_2O_3$ | 5.21 | 5.05 | 5.24 | 4.93 | 4.93 | 4.93 |
| Sum(RO + La2/3O) | 15.62 | 15.42 | 15.00 | 14.80 | 14.76 | 14.78 |
| Sum(RO + La2/3O)/$Al_2O_3$ | 1.26 | 1.23 | 1.15 | 1.15 | 1.15 | 1.15 |
| Strain Point (° C.) | 731 | 729 | 734 | 734 | 738 | 739 |
| CTE (×10−7/° C.) | 37.2 | 37.3 | 35.8 | 36.0 | 36.1 | 36.0 |
| density | 2.638 | 2.635 | 2.642 | 2.619 | 2.620 | 2.615 |
| Young's modulus (Gpa) | 80.7 | — | — | — | — | — |
| specific modulus | 30.6 | — | — | — | — | — |
| 200 poise T (° C.) | 1652 | 1643 | 1648 | 1653 | 1652 | 1659 |
| Liquidus T (° C.) | 1170 | 1180 | 1220 | 1195 | 1195 | 1200 |
| Liquidus phase | cels | cels | cels | cels | cels | cels |
| Liquidus Viscosity | 2.81E+05 | 2.47E+05 | 1.09E+05 | 1.98E+05 | 2.04E+05 | 1.99E+05 |

| Mol % | 77 | 78 | 79 | 80 | 81 | 82 |
|---|---|---|---|---|---|---|
| $SiO_2$ | 70.02 | 70.61 | 69.72 | 69.57 | 69.39 | 69.79 |
| $Al_2O_3$ | 12.86 | 12.59 | 12.50 | 12.36 | 12.22 | 12.37 |
| $B_2O_3$ | 1.75 | 1.75 | 1.93 | 1.93 | 1.93 | 1.70 |
| MgO | 4.94 | 4.83 | 4.89 | 4.99 | 5.09 | 4.99 |
| CaO | 4.94 | 4.83 | 5.22 | 5.32 | 5.43 | 5.32 |
| SrO | 1.40 | 1.38 | 1.46 | 1.49 | 1.52 | 1.49 |
| BaO | 3.53 | 3.45 | 3.71 | 3.78 | 3.86 | 3.78 |
| $La_2O_3$ | 0.00 | 0.00 | 0.00 | 0.00 | 0.00 | 0.00 |
| $As_2O_3$ | 0.00 | 0.00 | 0.00 | 0.00 | 0.00 | 0.00 |
| $Sb_2O_3$ | 0.47 | 0.47 | 0.49 | 0.48 | 0.48 | 0.48 |
| $ZrO_2$ | 0.02 | 0.02 | 0.01 | 0.00 | 0.00 | 0.00 |
| $SnO_2$ | 0.07 | 0.07 | 0.07 | 0.08 | 0.08 | 0.08 |
| MgO + $La_2O_3$ | 4.94 | 4.83 | 4.89 | 4.99 | 5.09 | 4.99 |
| Sum(RO + La2/3O) | 14.81 | 14.49 | 15.28 | 15.58 | 15.90 | 15.58 |
| Sum(RO + La2/3O)/$Al_2O_3$ | 1.15 | 1.15 | 1.22 | 1.26 | 1.30 | 1.26 |
| Strain Point (° C.) | 735 | 738 | 732 | 721 | 721 | 723 |
| CTE (×10−7/° C.) | 37.7 | 35.9 | 37.2 | 37.7 | 39 | 38.2 |

TABLE 1-continued

| | | | | | | |
|---|---|---|---|---|---|---|
| Density | 2.626 | 2.615 | 2.638 | 2.650 | 2.648 | 2.652 |
| Young's modulus (Gpa) | — | 81.4 | — | — | — | — |
| specific modulus | — | 31.1 | — | — | — | — |
| 200 poise T (° C.) | 1651 | 1661 | 1661 | — | — | — |
| Liquidus T (° C.) | 1200 | 1185 | 1170 | 1170 | 1165 | 1180 |
| Liquidus phase | cels | Cels | cels | cels | cels | cels |
| Liquidus Viscosity | 1.81E+05 | 2.67E+05 | 2.80E+05 | — | — | — |

| Mol % | 83 | 84 | 85 | 86 | 87 | 88 |
|---|---|---|---|---|---|---|
| $SiO_2$ | 69.62 | 70.01 | 69.84 | 69.36 | 69.58 | 69.81 |
| $Al_2O_3$ | 12.22 | 12.27 | 12.12 | 12.05 | 12.06 | 12.07 |
| $B_2O_3$ | 1.70 | 1.70 | 1.70 | 1.75 | 1.50 | 1.25 |
| MgO | 5.09 | 4.95 | 5.05 | 5.35 | 5.33 | 5.32 |
| CaO | 5.43 | 5.28 | 5.39 | 5.54 | 5.56 | 5.58 |
| SrO | 1.52 | 1.48 | 1.51 | 1.51 | 1.51 | 1.50 |
| BaO | 3.86 | 3.75 | 3.83 | 3.96 | 3.98 | 3.99 |
| $La_2O_3$ | 0.00 | 0.00 | 0.00 | 0.00 | 0.00 | 0.00 |
| $As_2O_3$ | 0.00 | 0.00 | 0.00 | 0.00 | 0.00 | 0.00 |
| $Sb_2O_3$ | 0.48 | 0.48 | 0.48 | 0.39 | 0.39 | 0.39 |
| $ZrO_2$ | 0.00 | 0.00 | 0.00 | 0.02 | 0.02 | 0.02 |
| $SnO_2$ | 0.08 | 0.08 | 0.08 | 0.07 | 0.07 | 0.07 |
| MgO + $La_2O_3$ | 5.09 | 4.95 | 5.05 | 5.35 | 5.33 | 5.32 |
| Sum(RO + La2/3O) | 15.90 | 15.46 | 15.78 | 16.36 | 16.38 | 16.39 |
| Sum(RO + La2/3O)/$Al_2O_3$ | 1.30 | 1.26 | 1.30 | 1.36 | 1.36 | 1.36 |
| Strain Point (° C.) | 726 | 728 | 725 | — | — | — |
| CTE ($\times 10^{-7}$/° C.) | 38.1 | 37.7 | 36.9 | — | — | — |
| density | 2.648 | 2.634 | 2.633 | — | — | — |
| Young's modulus (Gpa) | — | — | — | — | — | — |
| specific modulus | — | — | — | — | — | — |
| 200 poise T (° C.) | — | — | — | — | — | — |
| Liquidus T (° C.) | 1175 | 1170 | 1160 | — | — | — |
| Liquidus phase | cels | Cels | cels | — | — | — |
| Liquidus Viscosity | — | — | — | — | — | — |

*Sum(RO + La2/3O) = Sum(RO + $3La_2O_3$)

TABLE 2

| | Glass A | Glass B | Glass C |
|---|---|---|---|
| | | strain point | |
| Time (min) | 716° C. | 725° C. | 667° C. |
| | | Compaction (ppm) | |
| 0 | 0 | 0 | 0 |
| 5 | −12 | −16 | −43 |
| 10 | −20 | −23 | −74 |
| 15 | −26 | −31 | −91 |
| 30 | −40 | −45 | −137 |
| 60 | −61 | −62 | −202 |
| 120 | −94 | −87 | −270 |
| 180 | −110 | −108 | Not measured |
| 240 | −128 | −125 | −359 |
| 300 | −144 | −141 | −383 |

What is claimed is:

1. An alkali metal-free glass comprising in mole percent on an oxide basis:

| | |
|---|---|
| $SiO_2$ | 64.0-72.0 |
| $Al_2O_3$ | 9.0-16.0 |
| $B_2O_3$ | >0.0-5.0 |
| MgO | 2.0-7.5 |
| CaO | 2.0-7.5 |
| BaO | 1.0-6.0 | wherein:
(i) the glass satisfies the relationship:

$$1.15 \leq \Sigma(MgO+CaO+SrO+BaO)/(Al_2O_3) \leq 1.50,$$

where $Al_2O_3$, MgO, CaO, SrO, and BaO represent the mole percents of the respective oxide components, (ii) when the glass comprises the optional component SrO, the glass satisfies the relationship:

$$BaO/SrO \geq 2.0,$$

where BaO and SrO represent the mole percents of the respective oxide components, (iii) the amount of any oxide in the glass other than $SiO_2$, $Al_2O_3$, $B_2O_3$, MgO, CaO, SrO, BaO, and $La_2O_3$ is less than or equal to 2.0 mole percent, (iv) the glass has a strain point greater than or equal to 700° C., (v) the glass exhibits a dimensional change of less than 30 ppm for a 5 minute heat treatment at 600° C., and (vi) the glass has a Young's modulus to density ratio greater than or equal to 28.0 GPa·cm³/g.

2. The glass of claim 1 wherein the glass has a Young's modulus to density ratio greater than 30.0 GPa·cm³/g.

3. The glass of claim 1 wherein the glass has a Young's modulus to density ratio greater than 32.2 GPa·cm³/g.

4. The glass of claim 1 wherein the $As_2O_3$ and $Sb_2O_3$ concentrations in the glass are each less than or equal to 0.005 mole percent.

5. The glass of claim 1 wherein the glass has a liquidus viscosity greater than or equal to 150,000 poise.

6. A liquid crystal display substrate comprising the glass of claim 1.

7. A method for producing alkali metal-free glass sheets by a downdraw process comprising selecting, melting, and fining batch materials so that the glass making up the sheets has the composition of claim 1, wherein:

(a) the fining is performed without the use of substantial amounts of arsenic; and (b) a population of 50 sequential glass sheets produced by the downdraw process from the melted and fined batch materials has an average gaseous inclusion level of less than 0.10 gaseous inclusions/cubic centimeter, where each sheet in the population has a volume of at least 500 cubic centimeters.

8. The method of claim 7 wherein the downdraw process comprises a fusion draw process.

9. The method of claim 7 wherein the glass making up the sheets has a liquidus viscosity greater than or equal to 150,000 poise.

10. The method of claim 7 further comprising using the glass sheets as substrates for liquid crystal displays.

* * * * *